United States Patent [19]

McDaniels, Jr.

[11] Patent Number: 5,194,216
[45] Date of Patent: Mar. 16, 1993

[54] GUIDE PLATE FOR LOCATING RODS IN AN ARRAY

[75] Inventor: John D. McDaniels, Jr., Duluth, Ga.

[73] Assignee: Nuclear Assurance Corporation, Norcross, Ga.

[21] Appl. No.: 831,404

[22] Filed: Feb. 5, 1992

Related U.S. Application Data

[63] Continuation-in-part of Ser. No. 570,812, Aug. 22, 1990, Pat. No. 5,098,644.

[51] Int. Cl.$^5$ .............................................. G21C 19/32
[52] U.S. Cl. .................................... 376/261; 376/462
[58] Field of Search ............... 376/261, 260, 272, 462, 376/463

[56] References Cited

U.S. PATENT DOCUMENTS

| | | | |
|---|---|---|---|
| 4,659,536 | 4/1987 | Baudro | 376/261 |
| 4,731,219 | 3/1988 | Beneck et al. | 376/261 |
| 5,000,906 | 3/1991 | Ellingson et al. | 376/261 |

Primary Examiner—Daniel D. Wasil
Attorney, Agent, or Firm—Hopkins & Thomas

[57] ABSTRACT

A tool guide plate for use in a rod consolidation system for the consolidation of spent fuel rods within a storage container. The system utilizes a robot in conjunction with long reach tools to remove spent fuel rods from an array of rods in a rod assembly and to transfer them to a rod consolidation holder. The tool guide plate has a plurality of apertures shaped to receive the end of a tool and less than the number of rods in the array and has means located on the guide plate for indexing the apertures over the rod position to provide tool access to all of the rods in the array, the apertures providing access to a plurality of rod positions in each index position.

14 Claims, 5 Drawing Sheets

GUIDE PLATE FOR LOCATING RODS IN AN ARRAY

This application is a continuation-in-part of U.S. patent application Ser. No. 07/570,812, of John D. McDaniels, Jr., filed Aug. 22, 1990, now U.S. Pat. No. 5,098,644.

TECHNICAL FIELD

This invention relates to spent nuclear fuel rod storage, and, more particularly, to a method and apparatus for locating spent nuclear fuel rods in an array.

BACKGROUND OF THE INVENTION

Nuclear fuel assemblies for powering nuclear reactors generally consist of large numbers of fuel rods contained in discrete fuel rod assemblies. These assemblies or cells generally consist of a bottom end fitting or nozzle, a plurality of fuel rods extending upwardly therefrom and spaced from each other in a square pitch configuration, orientating or support grids spaced along the length of the assembly, a plurality of control guide tubes interspersed throughout the rod assembly, and a top end fitting or cap. The assembly is installed and removed from the reactor as a unit.

When the fuel rods have expended a large amount of their available energy, they are considered to be "spent" and the fuel rod assembly is pulled from the reactor and temporarily stored in an adjacent pool until the assemblies are transported to a reprocessing center or to permanent or temporary storage. Even though the rods are considered "spent" they are still highly radioactive and constitute a very real hazard both to personnel and to property.

In general, there are a number of alternatives available for disposition of the radioactive spent fuel rods, none of which is totally satisfactory. The fuel assemblies can be enclosed in a suitable basket and cask arrangement and shipped to a storage facility, or possibly, to a reprocessing plant. A second alternative is to store the spent fuel in a dry storage system. Dry storage entails either the use of a large number of metal casks or the building of massive concrete containers either above or below ground, which is a very expensive process, and, where the storage system is above ground, it is not readily acceptable to people living or working in its vicinity. A third alternative is the storage of the fuel units in the existing water pool originally designed for temporary storage. This type of storage is the simplest and cheapest, since the fuel rod assemblies can remain in the pool and be left there until the appropriate governmental agency collects them, often at the end of the life of the nuclear plant. However, such storage pools have a limited capacity, and, where they are adjacent to the reactor, necessitate the construction of a new pool when one becomes full.

Numerous attempts have been made to increase the capacity of a pool through a process known as fuel rod compaction or consolidation. This process, in brief, comprises removing the rods from the fuel rod assembly and placing them in a storage canister where they are placed in rows with minimal spacing. It is possible, with this process, to place the rods from two or more fuel assemblies into a single canister, thereby achieving approximately a 2:1 reduction in required pool volume, or, conversely, a 2:1 increase in pool storage capacity. However, successful consolidation has been an elusive goal for a number of reasons. Inasmuch as the pools are approximately forty feet deep, and inasmuch as the rods must remain immersed in the water at all times, all of the consolidation operations must be performed under the shield and cooling water. In addition, even though the rods are kept under water, the process could be quite hazardous to personnel performing the operation.

Prior art arrangements for achieving rod consolidation have included a system whereby the rods are pulled out row-by-row, as in, for example, a 14×14 matrix of rods, lifted and deposited in a tapered interim storage container, which tapers from a large area top opening to a bottom that has the area of a storage canister. After the intermediate container has the rods from approximately two fuel assemblies deposited therein, the intermediate container is placed over a storage canister, the bottom plate of the tapered container is lowered to cause the rods to slide into the storage canister. If the rods jam or stick, as they often do, they must be pushed from above the pool by operators using long rods. This last operation is made more difficult in that the rods develop on their outside surfaces what is referred to in the trade as "crud". When the fuel rods are pulled, this radioactive crud is scraped off and clouds the water making it difficult for the operators to see what they are doing and contaminating the pool. The method just described has proven to be quite slow and complicated, and can be hazardous to personnel.

An additional problem is caused in the close spacing of the rods, which are held in discrete locations in a fuel cell, as well as in the rod storage holder. this close spacing prevents a sequential pulling of adjacent rods out of the fuel cell and placing them in the storage holder because of the bulkiness of the end of the rod pulling and carrying tool. The tool cannot readily reach down to the top of a rod without hitting or being impeded by immediately adjacent rods.

In U.S. Pat. No. 4,731,219 of Beneck et al, there is shown an apparatus for compacting fuel rods which utilizes a tapered "quiver" to compact the rods. A grid structure is mounted on top of the quiver for guiding the rods into their desired positions. Elements of the grid structures are movable with respect to each other to achieve proper location of the rods being compacted. All of the rods are pulled from the fuel cell in two steps or operations, with a rotation of the pulling head after the first step to locate the multiple pullers over the rods that remained after the first pulling step. Various other prior art systems and method have been developed, none of which has proved to be wholly satisfactory.

Additionally, because of the depth of the pool and hence the extreme length of any pulling tool, precise positioning of the free or distal end of the tool over the rods is difficult to achieve, and, hence, precise location over a rod to be pulled becomes a hit or miss proposition. In U.S. Pat. No. 4,659,536 of Baudro, there is shown an indexing arrangement for a precise locating of the pulling tool. Baudro uses a guide funnel for guiding the pulling tool mounted on an indexing platform, which is movable along a pair of rails in a first direction. The rails are, in turn, mounted on a platform that is movable along a second pair of rails at right angles to the first pair of rails. Thus the funnel can be positioned over any rod in the array within the fuel cell, for example. Each of the indexing platforms requires its own drive means, which is responsive to control signals, as from a programmed computer. The overall indexing system is quite complicated and requires an indexing or locating step for each rod in the array of rods.

SUMMARY OF THE INVENTION

The present invention is a method and apparatus for precisely locating the distal or pulling end of a pulling tool over each rod in a fuel cell assembly, and for precisely locating the rod bearing tool over an empty space within a storage canister where it is desired to deposit the rod.

The apparatus of the present invention may, for example, be primarily used in a rod consolidation system which comprises a commercially available five or six axes robot mounted on the operations floor along the side of the storage pool. Directly below the robot within the pool, at a depth of, for example, twenty-five feet, is an apertured work table, and resting on the floor of the pool directly below the work table is a header and support base, which includes a manifold for a pair of vacuum filter assemblies which are mounted to, and extend upwardly from, the support base. Extending vertically from the support base and into openings in the work table are a plurality of holders configured to support fuel assemblies or fuel rod canisters, which are accessible from above the work table.

A plurality of individual or multiple purpose long reach tools are mounted on racks above and to either side of the work table. Each of the tools has a quick change coupling mounted to its upper end which matches and is adapted to couple with a corresponding quick change coupling on the end of the robot arm.

Locating pins are mounted on the top surface of the work table, and a position sensor carried by one of the long reach tools sends signals to the computer to give precise locations on the work table, thereby enabling the computer to determine the exact location of all components in the system.

In operation, three or four spent fuel assemblies are transferred, under water, to the spent fuel holders as dictated by the number of cells provided in the work table for fuel assemblies. Empty rod and scrap canisters are transferred to the rod canister holders and scrap canister holders. The upper end fittings of the fuel rod assemblies are then cut away by a long reach tool having a cutter on its lower end and placed in a scrap canister after which the rods are in discrete locations within the holder, and ready to be pulled.

The computer next directs the robot to couple with a fuel rod transfer tool having a collet for grasping a fuel rod and pulling it out of the rod assembly up into the tool. When this occurs, crud is scraped off of the rod, but, because of the downward water current created by the filter units with their associated pumps, the crud passed down the holder into the manifold and up through the filter, thereby preventing clouding of the water and contamination of the pool.

To insure that the rod transfer tool accesses and centers over a rod to be pulled, the apparatus of the present invention, which comprises access means comprising an apertured funnel guide plate is placed over the fuel rod assembly.

The guide plate of the invention has a plurality of funnel shaped apertures therein, with the wide portions of the funnels at the top surface of the plate. These funnel shaped openings provide a locating means for the rod pulling and carrying tool, but, because of the large diameter funnel mouths, the apertures in the plate cannot be spaced as closely together as are the fuel rods in a fuel cell. As a consequence, the guide plate, which may be substantially square, has a linear array of apertures which may be, for example, one-fourth of the number of rod positions in a fuel cell. Thus, with the apertured plate positioned over the fuel cell or fuel cell holder, the pulling tool only has access typically to one-fourth of the rods in the cell. In order that the remaining rods in the cell may be pulled, the guide plate has locating pins located at the four corners and depending from the underside thereof. These locating pins are adapted to fit into locating holes drilled in the work table or in the top flange of a fuel assembly holder. These locating holes are arrayed and spaced from each other to allow indexing the guide plate to any of four positions, thereby insuring that all of the rods will be accessed by the rod pulling tool. The plate has, on its top surface, a pin extending upwardly from the plate adapted to be grasped by the rod transfer tool so that it can be lifted and moved to each index position in turn. In general, the number of indexing positions is determined by the ratio of the number of rods or rod positions to the number of access holes in the guide plate.

In a second embodiment of the invention, the guide plate has, instead of locating pins, slotted flanges depending from the underside thereof. The slots are adapted to receive the top edges of a fuel assembly holder or of a fuel rod storage canister. Each of the depending flanges, which together form a square, has, for example, first and second slots adjacent its ends, hence at each corner of the guide plate array there are two or more locating slots, which permit indexing of the guide plate to any of four positions.

In another embodiment of the invention, the underside of the guide plate has a plurality of ridges or flanges extending downwardly and parallel to the sides of the plate, and adjacent thereto. The spaced ridges form channels between them which are adapted to receive the top edges of a rod storage canister of a fuel assembly holder. When each of the four side has two parallel channels, the plate can be indexed to any one of, for example, four positions over the canister or fuel assembly holder. For greater flexibility, and to provide more than four indexing positions, there can be multiple spaced flanges forming multiple parallel channels. Thus there may be, for example, two channels adjacent two opposed sides and four channels adjacent the other opposed sides.

Because the guide plate rests firmly on the top of the work table, or the fuel assembly holder, when the rod is pulled from the assembly, the guide plate is able to withstand the reactive load of the tool as it pulls the rod up into the hollow length of the tool. In addition, only four index steps need be performed to access all of the rods in a fuel cell, or all of the rod positions in a rod canister.

The guide plate of the invention has as its primary function the guiding of the collet of the rod pulling tool to a position directly over a rod for pulling the rod or directly over a rod position for inserting a rod into the storage canister. Because of its unique structure it has numerous other advantages also. For example, since it is firmly seated or positioned over a canister, it bears the reactive load of the tool as it pulls the rod up into itself. This load can be as much as 150 pounds. Also, the guide plate placed over the canister reduces the incoming water flow area at the top of the canister by a factor of five to seven times, thereby causing an increase in the velocity of the water flowing into and down through the canister and increasing the velocity of flow of radioactive crud downward toward the filters.

The guide plate of the invention is readily adaptable for use with other than linear arrays of rods, and can, itself, have other than a square configuration. From the foregoing it can be seen that a relatively simple, economical system for rod consolidation is achieved while at the same time personnel are not required to perform any of the hazardous consolidation functions. These and other advantages and features of the present invention will be more readily apparent from the following detailed description, when read in conjunction with the accompanying drawings.

DETAILED DESCRIPTION

Figure 1:
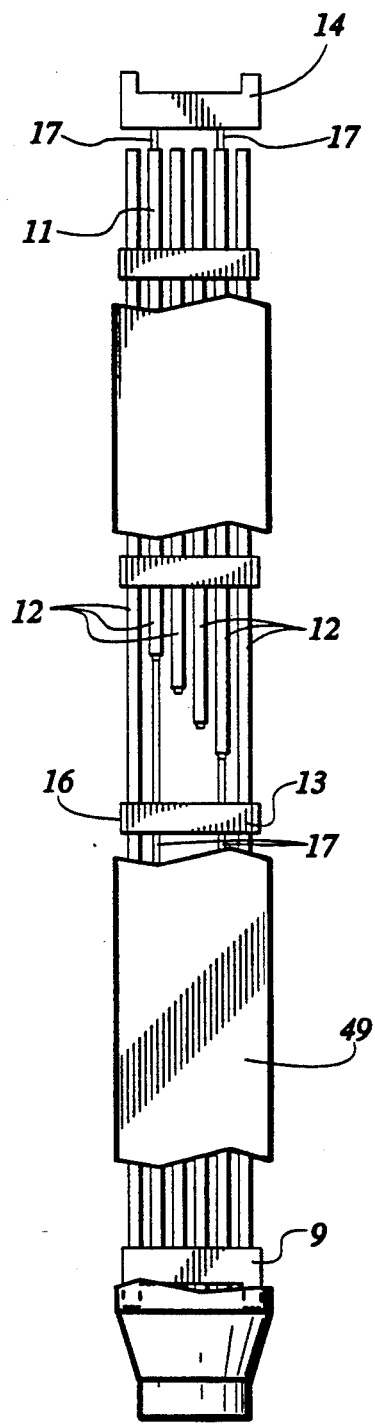
FIG. 1 is an elevation, partially cutaway view of a typical fuel rod assembly contained in a holder.

In FIG. 1 there is shown a fuel rod assembly 11, which comprises a plurality of fuel rods 12 mounted in a holder or skeleton 13 which comprises a top end member 14, a plurality of grids 16, and a plurality of guide tubes 17 which extend along the approximately fourteen foot length of the fuel assembly 11. The fuel rod assembly 11 is mounted in a rod assembly or cell holder 49 of generally rectangular cross-section. Members 14 and 17 are removed, as by sawing, prior to removing the rods from the assembly 11. The present invention is directed toward precisely locating a rod pulling tool over the fuel rods in an assembly 11 and precisely packing them in a fuel rod canister, not shown in FIG. 1.

Figure 2:
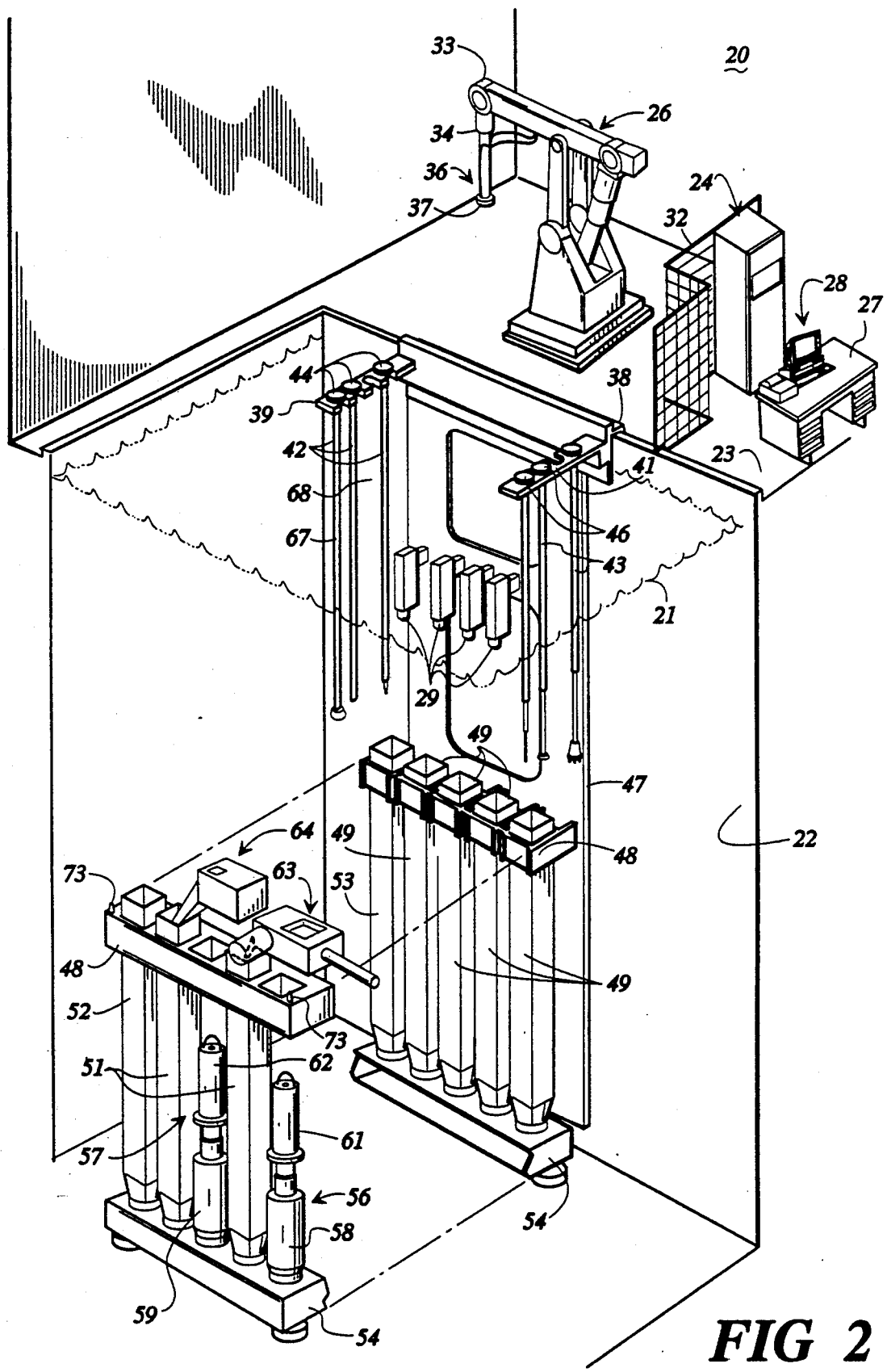
FIG. 2 is a perspective view of a rod consolidation apparatus utilizing the present invention.

FIG. 2 depicts the various elements of the rod consolidation system 20, a majority of the components of which remain below the water line 21 of the storage pool 22. At the top of pool is a deck 23 adjacent thereto which has thereon the major control components of the system 20. These components comprise a computer 24 which controls a five or six axis commercially available robot 26 which, in turn, handles the long reach tools for the system 20 and the method of rod consolidation. All of the functions of the system and steps of the method, with a few exceptions, are performed by the robot 26 and its associated long reach tools under control of the computer 24. Adjacent computer 24 is a monitoring station 27 which includes a closed circuit television monitor 28, the signals for which are received from a plurality of underwater television cameras 29, as will be explained more fully hereinafter. A protective wire cage 32 protects both the operator and the equipment from any accidental contact with the robot 26.

Attached to the free or distal end 33 of the arm of robot 26 is a shaft 34 having, at its lower or distal end 36 a quick change coupler 37. Quick change couplers are commercially available items, and any of a number of types of such couplers may be used.

A bracket 38 mounted on a curb at the top of the pool 22 has mounted thereto first and second tool racks 39 and 41 for holding a plurality of long reach tools 42, 42 and 43, 43, each having, at its top end, a quick change coupler 44 and 46 that matches quick change coupler 37. Each of the tools 42 and 43 is designed to perform a specific task, and when that task is to be performed, the robot removes that tool from the rack by means of the coupling, causes it to perform the task, and returns it to the rack. This arrangement has the important advantage of enabling almost all of the steps of the consolidation process to be performed within the pool, without the necessity of active human intervention.

Also mounted to bracket 38 is a depending frame member 47 to which is mounted a work table 48, shown exploded in FIG. 2. Alternatively, the work table 48 can be supported by the header 54 and joined thereto by an appropriate connecting structure. Work table 48 has mounted in apertures therein four fuel rod assembly holders 49, 49, 49 two scrap canister holders 51, 51, and two fuel rod canister holders 52 and 53. Holders 49, 52, and 53 rest in apertures in a support base 54, which also functions as a manifold for a pair of vacuum filter assemblies 56 and 57, each comprising a pump 58, 59 and filtering element 61, 62. Also mounted on work table 48 adjacent one of the scrap canister holders 51 is a grid compacting apparatus 63 and mounted on table 48 adjacent another of the scrap canister holders 51 is a guide tube chopper and compactor 64. Both compactors 63 and 64 have foldable chutes (not shown) for emptying the compacted trash into its adjacent scrap canister. The remaining trash canister in its holder 51 is for other scrap that is not compacted.

Television cameras 29, 29 and 29 are mounted to frame 47 above the table 48. The cameras are commercially available items having zoom lenses and integral lighting contained in waterproof housings. The cameras monitor the operation of the system, and more particularly, the location of the long reach tools 42 and 43 during operation. It is possible, using an appropriate tool calibrator fitted with proximity switches and located at the work table elevation in conjunction with the computer 24 and the robot 26, to position the distal or operative end of each tool to within twenty one-thousandths of an inch, thereby exceeding any accuracy obtainable when the tools are manipulated by other means.

Mounted on table 48 at the corners thereof are locator pins 73. One of the long reach tools carries an electromagnetic locator member thereon. Before operations are begun, this locator is placed over each of the locator pins 73 in turn and it generates an electrical signal which is transmitted to the computer. The combined inputs of the locating pins 73 enables the computer to determine the precise location of all of the various elements on the work table.

Figure 3:
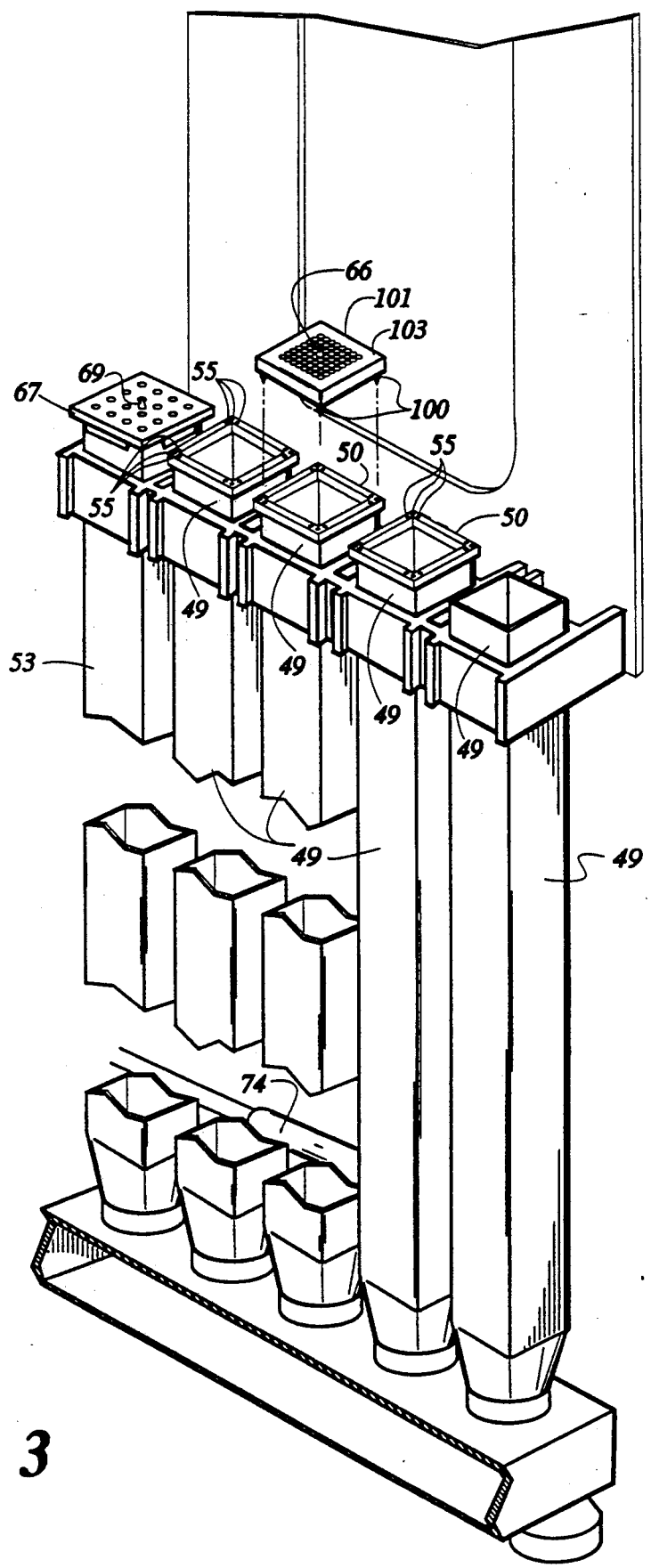
FIG. 3 is a perspective view of the apparatus involved in rod pulling and depositing.

FIG. 3 is a perspective partial view of the apparatus of the present invention, as used for locating a pulling tool over a fuel rod assembly, and for locating the tool over a fuel rod canister in which the rods are to be compacted.

As shown in FIG. 3 a funnel plate guide 101 having a top portion 103 and a plurality of spaced indexing pins 100 on the under side thereof is placed over a fuel rod assembly holder 49. At least two of holders 49 have flanges 50 formed at the top thereof. Flanges 50 have a plurality of indexing holes 55 drilled therein into which indexing pins 100 fit. The spacing of holes 55 and pins 100 is such that guide plate 101 can be indexed to any of four positions.

Figure 4:
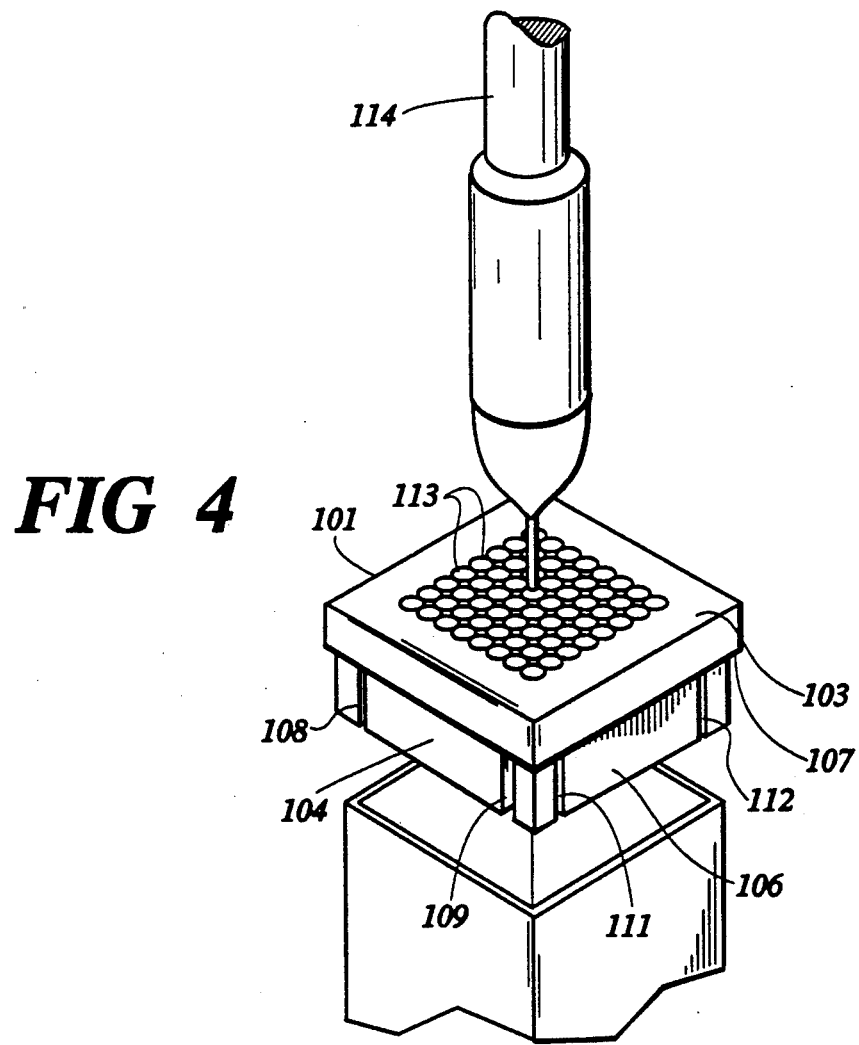
FIG. 4 is a perspective view of a portion of the fuel rod removal apparatus illustrating the guide plate of the present invention.

As shown in FIG. 4, top portion 103 has an array of funneled holes 113, 113 therein and extending through plate 101. These funnels 113 function to guide the rod removing tool 114, shown in FIG. 4, so that it is centered over a fuel rod in holder 49. Because of the funnel shape of the holes 113, guide plate 101 can only guide the tool 114 over every fourth rod in the fuel rod assembly, but with the four position indexing provided by holes 55 and pins 100, the tool eventually accesses all of the rods. The guide plate 101 has an upwardly extending pin 66 as seen in FIG. 3 and is moved by one of the long reach tools adapted to pick it up by pin 66 and move it to a new position where pins 100 engage different holes 55.

Tool 114, as shown in FIG. 4, has a rod grasping means, such as a collet, not shown, which grasps the rod over which it is centered and pulls it up inside of the tool for substantially its entire length. as the rod is pulled out of the rod assembly, radioactive "crud" is scraped from the rod, which is pulled down through the holder by the water current created by pumps 58 and 59 and forced through filter elements 61 and 62. This action assures that the water will stay sufficiently clear for the monitoring cameras 29 to create a clear picture and, more importantly not allow radioactive crud to contaminate the pool water.

Also shown in FIG. 4 is a modified guide plate 101 having a different indexing arrangement.

Guide plate 101 has a top portion 103 having upper and lower surfaces. Offset depending side flanges 104 and 106, only two of which are shown, depend from the lower surface of top portion 103. The depending sides 104 and 106 form a shoulder 107 with the lower surface of portion 103. Each of depending sides 104 has a pair of spaced slots 108 and 109 and each of depending sides 106 has a pair of spaced slots 111 and 112. The slots are so dimensioned that the walls of holder 49 can fit snugly therein, and are so spaced that when, for example, a wall of holder 49 is in slot 109, slot 108 is offset from the other wall so that shoulder 107 rests on top of the remaining walls. When a wall of holder 49 is in slot 108, slot 109 is offset. The same is true of slots 111 and 112, so that guide plate 101 can be indexed to four discrete positions on top of holder 49.

Figure 5:
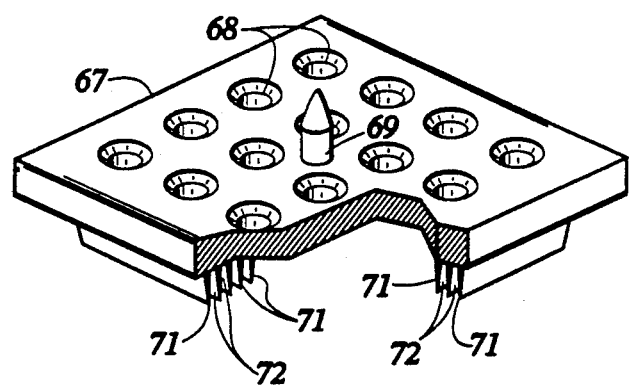
FIG. 5 is a partially cutaway perspective view of an alternative arrangement of the funnel guide plate of the invention.

After a rod has been pulled from a fuel rod assembly and drawn up into the rod pulling tool 114, the tool is swung to a position over the canister holder 53. Mounted on the top edges of a canister within holder 53 is a guide plate 67, the structure of which is best seen in FIG. 5. Plate 67 has a plurality of funnel shaped holes 68, 68 and a grasping pin 69 the same as with plate 101 of FIGS. 3 and 4. On the underside of plate 67 are downwardly extending spaced ridges 71 which form locating grooves 72. As can be seen in FIG. 5, there are three spaced ridges 71, 71 extending parallel to each side of plate 67, thereby forming two grooves 72, 72 extending parallel to each side.

The top edges of the canister fit within the grooves 72, thereby giving plate 67 four possible index positions. The ridges or flanges 71 do not extend to the full length of each side, thereby providing clearance for the corners of the canister.

After the rods have been removed from the rod assemblies and placed in the canister in holder 53, the skeleton remaining in holder 49 is converted to scrap, by means of long reach cutting tools and compactors 63 and 64. As portions of the fuel assembly are cut away, means, not shown, are provided for raising the skeleton in holder 49 so that the cutting tools have access thereto.

The operation of the apparatus of FIGS. 2, 3, and 4 is as follows. An empty fuel rod canister is placed in holder 53 and three or four fuel rod assemblies 11 are transferred, under water, to holders 49, and empty scrap canisters are transferred to holders 51. Under command from computer 24, robot 26 couples to a long reach tool for unlocking and removing the lid of the empty rod canister in holder 53. The lid can be stored or held by the tool after the tool is returned to its rack 39 or 41.

The robot next selects a long reach tool having a cutter or cutters on the distal end thereof, and the top 14 of the fuel rod assembly 11 is cut away and dropped into a scrap canister.

After returning the cutting tool to the rack 39 or 41, the computer directs the robot to couple with a suitable tool to place funnel guide plates 101 onto holder 49 by means of grasping pins 66 and guide plate 67 onto holder 53 and then return the tool to rack 39 or 41. The robot then couples to a fuel rod transfer tool 114, the distal end of which is guided to the fuel rods by guide plate 101. The tool grasps the top of a rod and pulls it up out of the rod assembly into the tool 114. After the rod is within tool 114, robot 26 swings the tool 114 to a position over guide plate 67 so that the tool 114 may release the rod into holder 53. The canister in holder 53 is preferably filled from the center outwardly. After enough rods have been removed and deposited in the canister to fill one-fourth of the row, guide plate 67 is indexed to a second position. The depositing of the rods and the indexing continues until the canister contains all of the rods of the rod assembly. After all of the rods exposed by the holes 113 in plate 101 have been removed from the fuel rod assembly, plate 101 is indexed to a different position by means of slots 108, 109, 111, and 112, thereby exposing a new set of rods. The process continues until all of the rods have been removed from the fuel assembly, and then operations are started on a second rod assembly and continued until the canister is filled. In practice, the rods of two or, in some cases, the rods of slightly more than two fuel assemblies can be consolidated into a single canister, thus making better use of the available storage space.

After the rod assembly has been emptied, leaving only a skeleton comprising guide tubes 17 and grids 16, the skeleton is elevated enough to enable cutters on a long reach tool to cut the guide tubes 17, to cut the grids 16 from the guide tubes 17, and to continue doing so until the skeleton is all cut down. The pieces of guide tubes are deposited in compactor 64 where they are repeatedly cut and compacted and then dropped into the adjacent scrap canister 51. The grid spacers 16 are deposited in compactor 63 where they are crushed into semi-solid blocks and then dropped into the adjacent canister 51.

The indexing of, for example, guide plate 101 over a fuel rod assembly is illustrated in FIGS. 6A through 6D. For illustrative purposes, the rod assembly is shown as having a linear eight by eight array of rods 12, and the funnel guide plate 101 has a linear four by four array of funnel shaped holes 113. It is to be understood that other arrays having more or fewer rods and guide plates having more or fewer funnel shaped holes may be used, depending upon the particular arrangement of fuel rod storage assemblies and members of rods to be stored in the canister. In addition, it is possible for other than linear arrays of rods and holes to be used. Thus, while a fuel rod array of sixty-four rods has been shown, the principles of the invention are equally applicable to larger or smaller arrays as well as differently configured arrays.

Figure 6A:
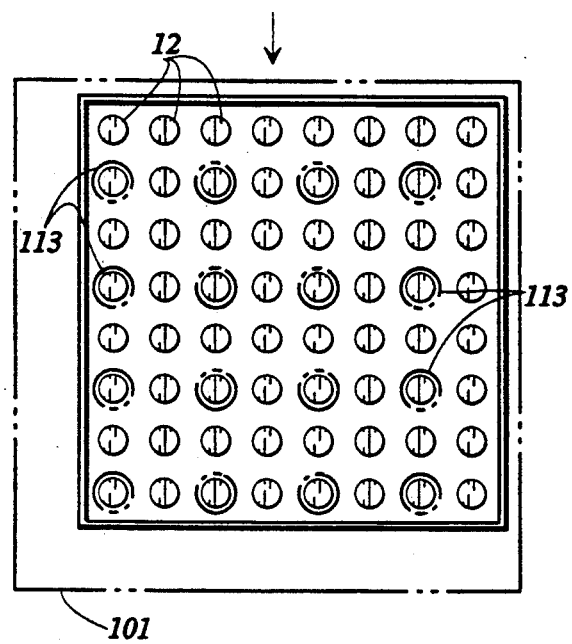
FIGS. 6A through 6D are plan views of the indexing steps of the funnel guide plate for a rod pulling operation.
Figure 6B:
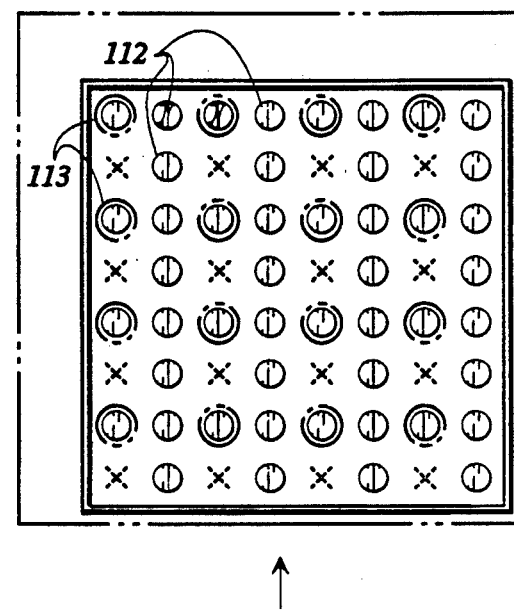

In FIG. 6A, the entire array of rods 12 is shown in solid lines, while the entire array of funnel shaped holes 113 is shown in dashed lines. It can be seen that the holes 113 locate over every other rod 12 both horizontally and vertically, as viewed in FIG. 6A. In FIG. 6B, the second index position of plate 101 is shown, with the voids where rods located in the position shown in FIG. 6A were pulled indicated by X. It can be seen that plate 101 has been shifted, as viewed in FIG. 6B, one row upward.

Figure 6C:
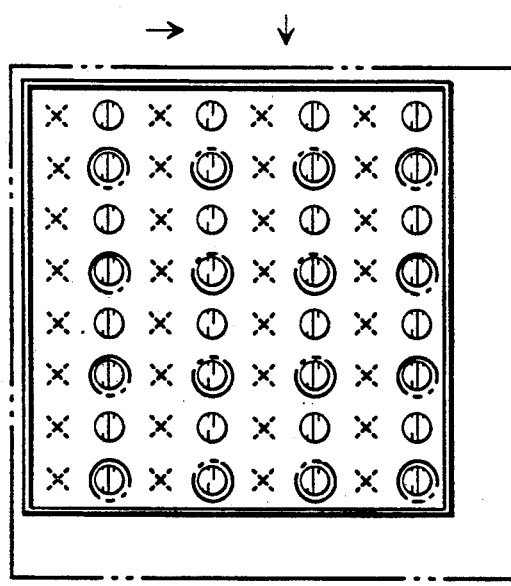
Figure 6D:
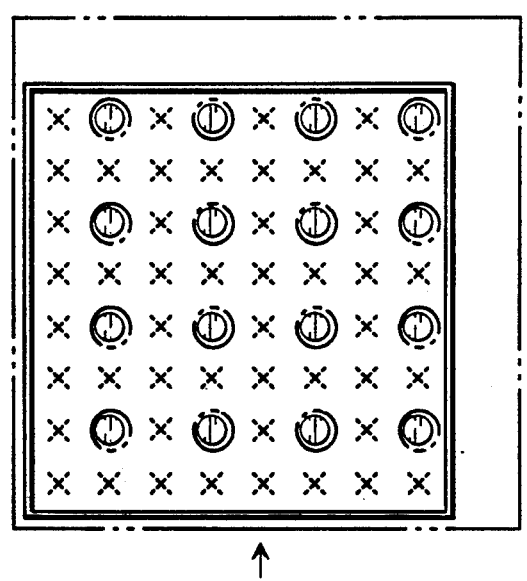

As viewed in FIG. 6C, plate 101 has been shifted one row to the right from its position in FIG. 6A, and as viewed in FIG. 6D, plate 101 has been shifted one row up from its position in FIG. 6C. FIG. 6D represents the last indexing step, after which no further rods remain in the fuel assembly. The indexing may be accomplished with any of the structures shown in FIGS. 3, 4, and 5, or by other indexing arrangements which may be apparent to workers in the art.

Proper location of loading positions in a canister for pulled rods is accomplished in the same way, although the number of rods in the array will be greater, as will the number of holes in guide plate 67. The indexing arrangement, however, remains the same.

The guide plate of the invention has been illustrated with a square array of sixty-four rods and a plate having sixteen funnel holes. The invention is also applicable for use with numerous other arrays. For example, in a fuel rod array of nine by nine (81) rod positions, the guide plate would have, for example, an array of five by five (25) funnel holes. In such an arrangement, twenty-five rods can be pulled at the first index position, twenty at the second, twenty at the third, and sixteen at the fourth. Obviously, other arrays might require more indexing steps, and the plate can readily be constructed to provide the necessary number of indexing steps. Furthermore, the guide plate of the invention can be adapted for other than square arrays of rod positions.

In the Figures, the various electrical and hydraulic connections have not been shown for the sake of avoiding confusion. It is to be understood that such connections are self-evident and readily understandable to workers in the art.

The apparatus and method of the present invention have been illustrated in a preferred embodiment thereof, which represents a relatively simple and economical way of achieving spent fuel rod location in a consolidation apparatus with a minimum of exposure of personnel to radioactivity. It will be readily apparent that various changes and alterations may occur to workers in the art without departure from the spirit and scope of the invention.

I claim:

1. A tool guiding means for use in a rod consolidation system where individual rods are withdrawn from an array of rods in a first fuel rod holder having a plurality of rod locations by means of a pulling tool having a distal, rod grasping end and are transferred to a second rod holder having a plurality of rod locations, said tool guiding means comprising;
   access means for providing access to a plurality of discrete rod locations simultaneously, said access means comprising;
   apertures guide means having a plurality of apertures for guiding the distal end of the tool to a position directly over any one of the plurality of rod locations accessed by said access means,
   said apertures being shaped to receive the distal, rod grasping end of the pulling tool, and
   said guide means having locating means thereon for positioning said guide means in any one of a plurality of discrete locations relative to the rod holder.

2. A tool guiding means for use in a rod consolidation system where individual rods are withdrawn from an array of rods in a first fuel rod holder having a plurality of rod locations by means of pulling tool having a distal, rod grasping end and are transferred to a second rod holder having a plurality of rod locations, said tool guiding means comprising;
   access means for providing access to a plurality of discrete rod locations simultaneously, said access means comprising;
   apertured guide means for guiding the distal end of the tool to a position directly over any one of the plurality of rod locations accessed by said access means,
   said guide means having thereon locating means for positioning said guide means in any one of a plurality of discrete locations relative to the rod holder,
   said apertured guide means comprising a top apertured plate having first and second surfaces and a plurality of offset depending sides forming shoulders with said second surface of said plate.

3. A tool guiding means as claimed in claim 2 wherein said locating means comprises a pair of spaced slots in each of said depending sides.

4. A tool guiding means for use in a rod consolidation system where individual rods are withdrawn from an array of rods in a first fuel rod holder having a plurality of rod locations by means of pulling tool having a distal, rod grasping end and are transferred to a second rod holder having a plurality of rod locations, said tool guiding means comprising;
   access means for providing access to a plurality of discrete rod locations simultaneously, said access means comprising;
   apertured guide means for guiding the distal end of the tool to a position directly over any one of the plurality of rod locations accessed by said access means,
   said guide means having thereon locating means for positioning said guide means in any one of a plurality of discrete locations relative to the rod holder,
   said apertured guide means comprising an apertured plate having first and second surfaces and a plurality of locating pins extending from said second surface.

5. A tool guiding means for use in a rod consolidation system where individual rods are withdrawn from an array of rods in a first fuel rod holder having a plurality of rod locations by means of pulling tool having a distal, rod grasping end and are transferred to a second rod holder having a plurality of rod locations, said tool guiding means comprising;
   access means for providing access to a plurality of discrete rod locations simultaneously, said access means comprising;

apertured guide means for guiding the distal end of the tool to a position directly over any one of the plurality of rod locations accessed by said access means, said guide means having thereon locating means for positioning said guide means in any one of a plurality of discrete locations relative to the rod holder, said apertured guide means comprising an apertured plate having first and second surfaces and a plurality of spaced flange members extending from said second surface.

6. A tool guiding means as claimed in claim 5 wherein said apertured plate is in the shape of a four sided figure having at least two flange members extending parallel to each side of the four sided figure.

7. For use in a rod consolidation system wherein individual rods are withdrawn from an array of rods in a first rod holder having a plurality of rod locations by means of a pulling tool having a distal, rod grasping end and are transferred to a second rod holder having a plurality of rod locations, a tool guiding means for guiding the tool to any one of a plurality of positions over the array of rod locations, said tool guiding means comprising:

a plate member having first and second surfaces and a plurality of apertures extending therethrough, the member of apertures in said plate being less than the number of rod locations in the array, locating means on said plate for indexing said plate over the array to a plurality of index positions, the number of index positions being equal to the ratio of the number of rod locations in the array to the number of apertures in said plate member, the plurality of apertures in said plate member being positioned to coincide with a different plurality of rod locations in the array at each index positions.

8. A tool guiding means as claimed in claim 8 wherein said locating means comprises a plurality of offset depending sides forming shoulders with said second surface of said plate, and a pair of spaced slots in each of said depending sides.

9. A tool guiding means as claimed in claim 8 wherein said locating means comprises a plurality of locating pins extending from said second surface.

10. A tool guiding means as claimed in claim 8 wherein said locating means comprises a plurality of spaced flange members extending from said second surface.

11. A tool guiding means as claimed in claim 7 wherein said locating means comprises a plurality of spaced flange members extending from said second surface.

12. A tool guiding means as claimed in claim 11 wherein said plate is in the shape of a four sided figure having at least two flange members extending parallel to each side of the four sided figure.

13. A tool guiding means as claimed in claim 12 wherein there are three flange members extending parallel to each side.

14. A rod consolidation system comprising:

a first rod holder having a plurality of rod locations in a first array, a second rod holder having a plurality of rod locations in a second array, a pulling tool for removing rods from and inserting rods into said first and second rod holders, said pulling tool having a distal, rod grasping end, a tool guiding means for guiding the distal end of said tool to any one of a plurality of positions over the array of rod locations in one of said rod holders, said tool guiding means comprising;

a plate member having first and second surfaces and a plurality of apertures extending therethrough, the number of apertures in said plate being less than the number of rod locations in the array in said one of said rod holders, locating means on said plate for indexing said plate over the array to a plurality of index positions, the number of index positions being approximately equal to the ratio of the number of rod locations in the array to the number of apertures in said plate member, the plurality of apertures in said plate member being positioned to coincide with a different plurality of rod locations in the array at each index position.

* * * * *